(12) United States Patent
Komaba et al.

(10) Patent No.: US 10,468,676 B2
(45) Date of Patent: Nov. 5, 2019

(54) POSITIVE ELECTRODE-ACTIVE SUBSTANCE FOR SODIUM SECONDARY CELL, POSITIVE ELECTRODE FOR SODIUM SECONDARY CELL, AND SODIUM SECONDARY CELL

(71) Applicants: Sumitomo Chemical Company, Limited, Tokyo (JP); Tokyo University of Science Foundation, Tokyo (JP)

(72) Inventors: Shinichi Komaba, Tokyo (JP); Naoaki Yabuuchi, Tokyo (JP); Masaya Yano, Imizu (JP); Satoru Kuze, Tsukuba (JP)

(73) Assignees: SUMITOMO CHEMICAL COMPANY, LIMITED, Tokyo (JP); TOKYO UNIVERSITY OF SCIENCE FOUNDATION, Tokyo (JP)

( * ) Notice: Subject to any disclaimer, the term of this patent is extended or adjusted under 35 U.S.C. 154(b) by 0 days.

(21) Appl. No.: 14/780,833

(22) PCT Filed: Mar. 17, 2014

(86) PCT No.: PCT/JP2014/057122
§ 371 (c)(1),
(2) Date: Sep. 28, 2015

(87) PCT Pub. No.: WO2014/156765
PCT Pub. Date: Oct. 2, 2014

(65) Prior Publication Data
US 2016/0056461 A1   Feb. 25, 2016

(30) Foreign Application Priority Data
Mar. 28, 2013 (JP) .................................. 2013-070300

(51) Int. Cl.
*H01M 4/505* (2010.01)
*H01M 4/525* (2010.01)
(Continued)

(52) U.S. Cl.
CPC ......... *H01M 4/505* (2013.01); *H01M 2/1653* (2013.01); *H01M 2/1686* (2013.01);
(Continued)

(58) Field of Classification Search
None
See application file for complete search history.

(56) References Cited

U.S. PATENT DOCUMENTS

| | | |
|---|---|---|
| 6,447,958 B1 | 9/2002 | Shinohara et al. |
| 2009/0159838 A1 | 6/2009 | Okada et al. |

(Continued)

FOREIGN PATENT DOCUMENTS

| | | |
|---|---|---|
| CN | 101855173 A | 10/2010 |
| JP | H10324758 A | 12/1998 |

(Continued)

OTHER PUBLICATIONS

International Search Report dated Jun. 17, 2014 in International Application No. PCT/JP2014/057122.
The Electrochemical Society of Japan, the 79th Meeting, Proceedings, 3D23, p. 134 (2012).
(Continued)

*Primary Examiner* — Wojciech Haske
(74) *Attorney, Agent, or Firm* — Panitch Schwarze Belisario & Nadel LLP

(57) ABSTRACT

A positive electrode-active material is provided for use in a positive electrode for a sodium secondary cell and a sodium secondary cell. Also provided is a positive electrode for a sodium secondary cell and a sodium secondary cell having a high energy density. The positive electrode-active material for a sodium secondary cell includes a composite metal oxide, which has an α-NaFeO$_2$ type crystal structure and is denoted by Formula (1) described below:

$$Na_a(Fe_wNi_xMn_{y-z}Ti_z)O_2 \qquad (1),$$

wherein a is greater than or equal to 0.6 and less than or equal to 1.0, w is greater than 0 and less than 0.5, x is greater (Continued)

than 0 and less than 0.5, y is greater than 0.03 and less than or equal to 0.5, z is greater than or equal to 0.03 and less than 0.5, and $w+x+y=1.0$, and $y>z$.

11 Claims, 4 Drawing Sheets

(51) Int. Cl.
    *H01M 10/054*      (2010.01)
    *H01M 10/0569*      (2010.01)
    *H01M 2/16*      (2006.01)
    *H01M 4/02*      (2006.01)

(52) U.S. Cl.
    CPC ......... *H01M 4/525* (2013.01); *H01M 10/054* (2013.01); *H01M 10/0569* (2013.01); *H01M 2004/028* (2013.01); *H01M 2220/10* (2013.01); *H01M 2220/20* (2013.01); *H01M 2220/30* (2013.01); *H01M 2300/0034* (2013.01)

(56) References Cited

U.S. PATENT DOCUMENTS

| | | |
|---|---|---|
| 2010/0248001 A1 | 9/2010 | Kuze et al. |
| 2011/0159345 A1 | 6/2011 | Makidera et al. |
| 2012/0119167 A1 | 5/2012 | Matsumoto et al. |
| 2013/0330608 A1 | 12/2013 | Nitta et al. |

FOREIGN PATENT DOCUMENTS

| | | |
|---|---|---|
| JP | 2000030686 A | 1/2000 |
| JP | 2006179473 A | 7/2006 |
| JP | 2009135092 A | 6/2009 |
| JP | 2011236117 A | 11/2011 |
| JP | 2012182087 A | 9/2012 |
| JP | 2012252962 A | 12/2012 |
| WO | 2010024304 A1 | 3/2010 |

OTHER PUBLICATIONS

Office Action dated Jan. 4, 2017 in JP Application No. 2015-508318.
Kuze et al., "Development of a Sodium Ion Secondary Battery," Sumitomo Kagaku R&D Report, vol. 2013, pp. 1-13 (2013).

POSITIVE ELECTRODE-ACTIVE SUBSTANCE FOR SODIUM SECONDARY CELL, POSITIVE ELECTRODE FOR SODIUM SECONDARY CELL, AND SODIUM SECONDARY CELL

CROSS-REFERENCE TO RELATED APPLICATION

This application is a Section 371 of International Application No. PCT/JP2014/057122, filed Mar. 17, 2014, which was published in the Japanese language on Oct. 2, 2014, under International Publication No. WO 2014/156765 A1, and the disclosure of which is incorporated herein by reference.

TECHNICAL FIELD

The present invention relates to a positive electrode-active material for a sodium secondary cell which includes a sodium-containing composite metal oxide having an α-NaFeO$_2$ type crystal structure, a positive electrode for a sodium secondary cell including the active material, and a sodium secondary cell.

Priority is claimed on Japanese Patent Application No. 2013-70300, filed Mar. 28, 2013, the content of which is incorporated herein by reference.

BACKGROUND ART

Recently, a lithium secondary cell has been commercialized as a secondary cell, and the application thereof has been expanded. However, lithium used in such a lithium secondary cell is not an abundant resource, and there is a concern that lithium resources will be exhausted in the future.

On the other hand, sodium, in the same alkali metal group as lithium, is more abundant than lithium as a resource, and is one digit less expensive than lithium. In addition, sodium has a comparatively high standard potential, and thus it is considered that a sodium secondary cell can be a secondary cell having higher capacitance.

If a sodium secondary cell can be used instead of the current lithium secondary cells, a large secondary cell such as an on-vehicle secondary cell or a secondary cell for distributed power storage can be mass-produced without considering the scarcity of the resource.

In PTL 1 and NPL 1, a sodium-containing composite metal oxide represented by NaFe$_{0.4}$Ni$_{0.3}$Mn$_{0.3}$O$_2$ is disclosed that can be used as an electrode-active material.

CITATION LIST

Patent Literature

[PTL 1] Japanese Unexamined Patent Application, First Publication No. 2011-236117

Non-Patent Literature

[NPL 1] The Electrochemical Society of Japan, the 79th Meeting, Proceedings, p. 134

SUMMARY OF INVENTION

Technical Problem

However, in a sodium secondary cell using the sodium-containing composite metal oxide of PTL 1 and NPL 1 as the positive electrode-active material, a discharge voltage is not sufficient, and an energy density is lower. Therefore, the sodium secondary cell of the related art cannot be sufficiently used as a nonaqueous electrolyte secondary cell.

The present invention has been made in consideration of such circumstances, and one object thereof is to provide a positive electrode-active material for a sodium secondary cell which can be used in a sodium secondary cell having a higher energy density, a positive electrode for a sodium secondary cell, and a sodium secondary cell.

Solution to Problem

In order to resolve the above problem, an aspect of the present invention provides a positive electrode-active material for a sodium secondary cell, including a composite metal oxide which has an α-NaFeO$_2$ type crystal structure and is denoted by Formula (1) described below.

$$Na_a(Fe_wNi_xMn_{y-z}Ti_z)O_2 \tag{1}$$

(In which a is greater than or equal to 0.6 and less than or equal to 1, w is greater than 0 and less than 0.5, x is greater than 0 and less than 0.5, y is greater than 0.03 and less than or equal to 0.5, z is greater than or equal to 0.03 and less than 0.5, w+x+y=1, and y>z.)

In the aspect of the present invention, it is preferable that z be less than or equal to 0.3.

In the aspect of the present invention, it is preferable that y be greater than or equal to 0.2.

In the aspect of the present invention, it is preferable that w be greater than or equal to 0.15 and less than or equal to 0.45.

In the aspect of the present invention, it is preferable that a, w, x, and y satisfy the relationship of a+3w+2x+4y=4.

In addition, another aspect of the present invention provides a positive electrode for a sodium secondary cell which contains the positive electrode-active material for a sodium secondary cell described above.

In addition, still another aspect of the present invention provides a sodium secondary cell, including a positive electrode, a negative electrode, and a nonaqueous electrolyte, in which the positive electrode includes the positive electrode for a sodium secondary cell described above.

In the aspect of the present invention, it is preferable that the sodium secondary cell further include a nonaqueous electrolyte solution in which the nonaqueous electrolyte is dissolved in an organic solvent, in which the organic solvent includes an organic solvent having a fluorine substituent group.

In the aspect of the present invention, it is preferable that the organic solvent having the fluorine substituent group be 4-fluoro-1,3-dioxolan-2-one.

In the aspect of the present invention, it is preferable that the sodium secondary cell include a positive electrode, a negative electrode, a separator arranged between the positive electrode and the negative electrode, and a nonaqueous electrolyte solution.

In the aspect of the present invention, it is preferable that the separator be formed by laminating a heat-resistant porous layer containing a heat-resistant resin and a porous film.

Effects of Invention

According to the present invention, it is possible to provide a positive electrode-active material for a sodium secondary cell which can provide a sodium secondary cell having a higher energy density, a positive electrode for a sodium secondary cell, and a sodium secondary cell.

DESCRIPTION OF EMBODIMENTS

Figure 1A:
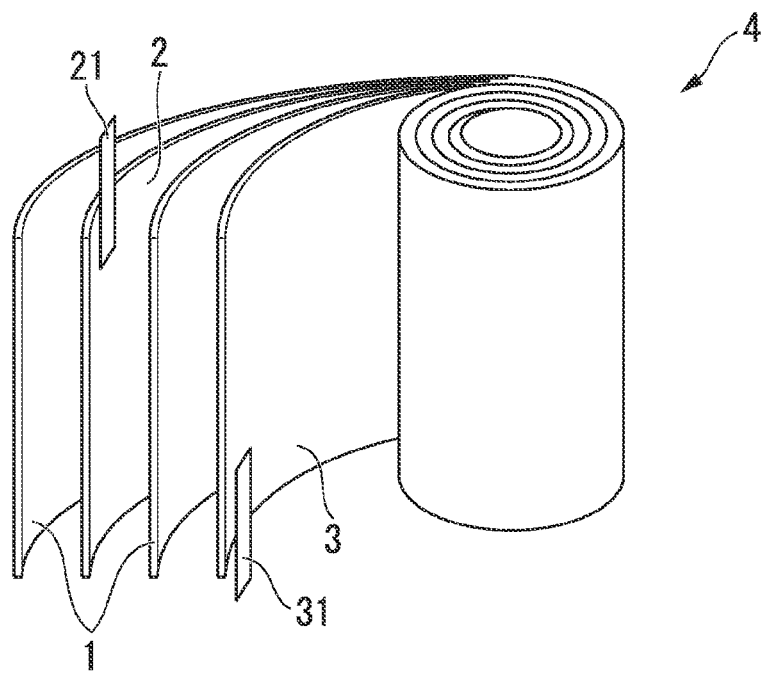
FIG. 1A is a schematic view illustrating an electrode group in an example of a sodium secondary cell of a liquid of this embodiment.

<Positive Electrode-Active Material for Sodium Secondary Cell>

A positive electrode-active material for a sodium secondary cell of this embodiment includes a composite metal oxide which has an α-NaFeO$_2$ type crystal structure as described below and is represented by Formula (1) described below.

$$Na_a(Fe_wNi_xMn_{y-z}Ti_z)O_2 \quad (1)$$

(In which a is greater than or equal to 0.6 and less than or equal to 1, w is greater than 0 and less than 0.5, x is greater than 0 and less than 0.5, y is greater than 0.03 and less than or equal to 0.5, z is greater than or equal to 0.03 and less than 0.5, w+x+y=1, and y>z.)

In Formula (1) described above, when a is greater than or equal to 0.6, the capacitance (electric capacitance) of a sodium secondary cell formed by using a positive electrode material obtained is higher, and an energy density becomes higher. In addition, when a exceeds 1, impurities such as sodium carbonate are easily mixed into a positive electrode material to be obtained. Therefore, the resistance (electric resistance) of a sodium cell using this positive electrode material is higher, and an energy density becomes lower. In particular, a may be greater than or equal to 0.8 and less than or equal to 1.0. In this range, the capacitance is maximized.

Furthermore, the energy density indicates the amount of energy per unit weigh or unit volume of the active material of the cell, and for example, is calculated from a product of discharge capacitance (mAh/g) measured by a constant current charging and discharging test in which a current to be applied is constant and a discharge voltage (V), and is evaluated by unit of Wh/g, Wh/kg, or Wh/L.

In Formula (1) described above, when w exceeds 0, the composite metal oxide only having an α-NaFeO$_2$ type crystal structure is easily obtained, and the energy density becomes higher. In addition, when w is less than 0.5, in the sodium secondary cell formed by using the positive electrode-active material for a sodium secondary cell to be obtained, the discharge capacitance (herein, the definition will be described below) becomes higher.

In the positive electrode-active material for a sodium secondary cell of this embodiment, in order to obtain the composite metal oxide only having an α-NaFeO$_2$ type crystal structure and to further increase an energy density, w is preferably greater than or equal to 0.15, and is more preferably greater than or equal to 0.2. In addition, in the sodium secondary cell formed by using the positive electrode-active material for a sodium secondary cell to be obtained, in order to increase the discharge capacitance, w is preferably less than or equal to 0.45, and is more preferably less than or equal to 0.4. The upper limit value and the lower limit value of w can be arbitrarily combined. For example, in order to further increase the energy density, w may be in a range of 0.15 to 0.45, and in order to further increase the discharge capacitance, w may be in a range of 0.2 to 0.4.

In Formula (1) described above, when x exceeds 0, in the sodium secondary cell formed by using the positive electrode-active material for a sodium secondary cell to be obtained, the discharge capacitance becomes higher. In addition, when x is less than 0.5, the composite metal oxide only having an α-NaFeO$_2$ type crystal structure is easily obtained, and the energy density becomes higher. For example, in order to increase the discharge capacitance and the energy density of the sodium secondary cell, x may be in a range of 0 to 0.5.

When the positive electrode-active material for a sodium secondary cell of this embodiment includes the composite metal oxide only having an α-NaFeO$_2$ type crystal structure, in order to further increase the energy density, it is preferable that x be less than or equal to 0.4. In addition, in the sodium secondary cell formed by using the positive electrode-active material for a sodium secondary cell obtained, in order to increase the discharge capacitance, it is preferable that x be greater than or equal to 0.2. For example, in particular, in order to increase the discharge capacitance of the sodium secondary cell and to increase the energy density, x may be in a range of 0.2 to 0.4.

In Formula (1) described above, when y exceeds 0.03, the capacitance of the sodium secondary cell formed by using the positive electrode material obtained is higher, and the energy density becomes higher. In addition, when y is less than or equal to 0.5, the composite metal oxide only having an α-NaFeO$_2$ type crystal structure is easily obtained. For example, in order to increase the energy density of the sodium secondary cell and to obtain the composite metal oxide only having an α-NaFeO$_2$ type crystal structure, y may be in a range of 0.03 to 0.5.

In order that the positive electrode-active material for a sodium secondary cell of this embodiment have a discharge capacitance of greater than or equal to 100 mAh/g, it is preferable that y be greater than or equal to 0.2. In addition, in order that the obtained positive electrode-active material for a sodium secondary cell is the composite metal oxide only having an α-NaFeO$_2$ type crystal structure, it is preferable that y be less than or equal to 0.4. For example, in order that the sodium secondary cell have a discharge capacitance of greater than or equal to 100 mAh/g and the composite metal oxide only having an α-NaFeO$_2$ type crystal structure is obtained, y may be in a range of 0.2 to 0.4.

Furthermore, herein, the "discharge capacitance of the active material (unit: mAh/g)" is a value obtained by dividing the discharge capacitance measured with respect to the sodium secondary cell by the mass of the positive electrode-active material contained in the positive electrode used in the sodium secondary cell, and indicates the discharge capacitance per unit mass of the active material. The discharge capacitance of this embodiment, for example, is evaluated on the basis of the constant current charging and discharging test in which the current to be applied is constant.

In Formula (1) described above, when w, x, and y satisfy the relationship of w+x+y=1, the cycle characteristics of the sodium secondary cell formed by using the positive electrode-active material for a sodium secondary cell to be obtained are particularly improved.

Furthermore, the "cycle characteristics" are rates for maintaining capacitance at the time of repeatedly performing charge and discharge, and a high rate for maintaining capacitance at the time of repeatedly performing the charging and discharging is evaluated as "excellent cycle characteristics". The cycle characteristics of this embodiment, for example, are evaluated on the basis of the constant current charging and discharging test in which the current to be applied is constant.

In Formula (1) described above, when z is greater than or equal to 0.03, the operating voltage of the cell becomes higher, and the energy density becomes higher. In addition, when z is less than 0.5, in the sodium secondary cell formed by using the obtained positive electrode-active material for a sodium secondary cell, the discharge capacitance becomes higher. For example, in particular, in order to increase the discharge capacitance of the sodium secondary cell and to increase the energy density, z may be in a range of 0.03 to 0.5.

In the positive electrode-active material for a sodium secondary cell of this embodiment, in order to further increase the energy density, it is preferable that z be greater than or equal to 0.1. In addition, in the sodium secondary cell formed by using the obtained positive electrode-active material for a sodium secondary cell, in order to improve the cycle characteristics, it is preferable that z be less than or equal to 0.3. For example, in particular, in order to increase the energy density of the sodium secondary cell and to improve the cycle characteristics, z may be in a range of 0.1 to 0.3.

In Formula (1) described above, when a relational expression of y>z is satisfied, the discharge capacitance of the sodium secondary cell formed by using the positive electrode-active material for a sodium secondary cell to be obtained is improved.

In Formula (1) described above, when a, w, x, and y satisfy the relationship of a+3w+2x+4y=4, the composite metal oxide only having an α-NaFeO$_2$ type crystal structure is easily obtained. Therefore, setting a, w, x, and y to satisfy the relationship of a+3w+2x+4y=4 is particularly preferable.

The positive electrode-active material for a sodium secondary cell of this embodiment has an α-NaFeO$_2$ type crystal structure. Here, the α-NaFeO$_2$ type crystal structure, for example, is a structure in which light metal such as Na is arranged in one octahedron position of a cubically close-packed O layer and transition metal such as Fe is arranged on the other position, and the light metal and the transition metal are laminated on each other while being interposed in the O layer. The α-NaFeO$_2$ type crystal structure is also referred to as a layered rock salt type structure. When the positive electrode-active material for a sodium secondary cell has such a structure, the sodium secondary cell formed by using this material can dope and dedope sodium ions at the time of driving to great effect. Furthermore, regarding light metal such as Li, Mg, or Al, a part of a transition metal position can be substituted with the light metal. Having a crystal structure of the α-NaFeO$_2$ type crystal structure, for example, can be confirmed by the fact that a peak can be attributed to a space group R-3m or C2/m in an XRD chart illustrating the result of a powder X-ray analysis.

The positive electrode-active material for a sodium secondary cell of this embodiment may have an impurity phase and an impurity compound such as NiO insofar as the positive electrode-active material for a sodium secondary cell has an α-NaFeO$_2$ type crystal structure in the crystal. In addition, it is preferable that the positive electrode-active material for a sodium secondary cell of this embodiment be a single phase composite metal oxide only having an α-NaFeO$_2$ type crystal structure.

It is preferable that a BET specific surface area of the positive electrode-active material for a sodium secondary cell of this embodiment be greater than or equal to 0.1 m$^2$/g and less than or equal to 5 m$^2$/g. By setting the BET specific surface area of the positive electrode-active material for a sodium secondary cell to be in such a range, in particular, the energy density tends to be higher. Here, the BET specific surface area is a value indicating surface area per mass of the material, and is a value measured from a mass obtained by adsorbing gas particles to solid particles (a surface area per adsorption mass). In this embodiment, for example, the BET specific surface area may be obtained by using a measurement method such as a BET method using nitrogen molecules.

The BET specific surface area of the positive electrode-active material for a sodium secondary cell is more preferably greater than or equal to 0.3 m$^2$/g, and is even more preferably greater than or equal to 0.5 m$^2$/g. In addition, the BET specific surface area is more preferably less than or equal to 4.5 m$^2$/g, and is even more preferably less than or equal to 4 m$^2$/g. The upper limit value and the lower limit value of the BET specific surface area can be arbitrarily combined. For example, the BET specific surface area of the positive electrode-active material for a sodium secondary cell may be 0.3 m$^2$/g to 4.5 m$^2$/g, and may be 0.5 m$^2$/g to 4 m$^2$/g.

In the positive electrode-active material for a sodium secondary cell of this embodiment, one or more metal elements selected from the group consisting of Li, K, Ag, Mg, Ca, Sr, Ba, Al, Ga, In, V, Cr, Co, Cu, Zn, Sc, Y, Nb, Mo, La, Ce, Pr, Nd, Sm, Eu, Gd, Tb, Ho, Er, Tm, Yb, and Lu may be included in addition to the metal included in Formula (1), within a range not impairing the effect of the present invention.

<Manufacturing Method of Positive Electrode-Active Material for Sodium Secondary Cell>

The positive electrode-active material for a sodium secondary cell of this embodiment includes the composite metal oxide, and can be manufactured by calcining a raw material having a composition corresponding to the composite metal oxide.

Examples of the raw material of the positive electrode-active material for a sodium secondary cell include a mixture of the metal-containing compound. For example, a plurality of metals are suspended and mixed in a solvent such as water, and thus a mixture is obtained, and then the mixture is calcined. Therefore, the composite metal oxide having an α-NaFeO$_2$ type crystal structure is manufactured.

More specifically, first, metal elements contained in a composite metal oxide of a desired positive electrode-active material for a sodium secondary cell are prepared as a metal-containing compound which contains the metal elements.

Subsequently, the metal-containing compound is weighed and mixed so that the composition corresponds to a metal element ratio of the composite metal oxide included in the positive electrode-active material for a sodium secondary cell, and thus a mixture is obtained.

Subsequently, the obtained mixture is calcined, and thus the positive electrode-active material for a sodium secondary cell including the composite metal oxide can be manufactured.

For example, examples of the composite metal oxide which is preferable as the positive electrode-active material for a sodium secondary cell include a composite metal oxide having a metal element ratio of Na:Fe:Ni:Mn:Ti=1:0.4:0.3:0.15:0.15. Such a composite metal oxide can be manufactured by weighing and mixing each raw material of $Na_2CO_3$, $Fe_3O_4$, $Ni_2O_3$, $MnO_2$, and $TiO_2$ such that a molar ratio of Na:Fe:Ni:Mn:Ti is 1:0.4:0.3:0.15:0.15, and by calcining the obtained mixture.

Examples of the metal-containing compound used as the raw material of the positive electrode-active material for a sodium secondary cell include a compound such as an oxide, a hydroxide, a carbonate, a nitrate, a halide, or an oxalate, which can be changed to an oxide at a high temperature by being bonded to an oxygen atom contained therein, an oxygen molecule in the atmosphere, or the like.

Examples of a sodium compound of the metal-containing compound include one or more compounds selected from the group consisting of sodium hydroxide, sodium chloride, sodium nitrate, sodium peroxide, sodium sulfate, sodium hydrogen carbonate, sodium oxalate, and sodium carbonate. In addition, a hydrate of these compounds may be used as the metal-containing compound.

Among them, the sodium carbonate is preferable as the metal-containing compound from a viewpoint of lower hygroscopicity and higher handleability. In addition, the sodium hydroxide has high reactivity at a low temperature and can be calcined at a comparatively low calcination temperature, and thus is preferable from a viewpoint of lower manufacturing costs.

In addition, in the metal-containing compound, $MnO_2$ is preferable as a manganese compound, $Fe_3O_4$ is preferable as an iron compound, $Ni_2O_3$ is preferable as a nickel compound, and $TiO_2$ is preferable as a titanium compound. In addition, a compound containing two or more types of the metal elements contained in the composite metal oxide of the desired positive electrode-active material for a sodium secondary cell may be used as the metal-containing compound. Examples of such a metal-containing compound, for example, include $FeTiO_3$ containing titanium and iron. In addition, a hydrate of these compounds may be used as the metal-containing compound.

In addition, compounds obtained by using the following coprecipitation method can be used as metal-containing compounds other than the sodium compound in the metal-containing compounds used as the raw material of the positive electrode-active material for a sodium secondary cell. In the following description, the metal-containing compound other than the sodium compound obtained by using the coprecipitation method will be referred to as a "transition metal-containing compound" for the sake of convenience.

Specifically, first, a compound such as a chloride, a nitrate, an acetate, a formate, an oxalate, and a sulfate of Mn, Fe, Ni, or Ti is dissolved in water, and thus a mixed aqueous solution is obtained. Subsequently, the aqueous solution is in contact with a precipitant, and thus it is possible to obtain a precipitate containing a desired transition metal-containing compound.

In the compounds used as the raw material of the transition metal-containing compound, a chloride or a sulfate is preferable. In addition, when a compound rarely dissolved in water, for example, an oxide, a hydroxide, or a metal material is used as the raw material of the transition metal-containing compound, an aqueous solution may be obtained by dissolving these materials in an acid such as a hydrochloric acid, a sulfuric acid, or a nitric acid or an aqueous solution thereof.

Examples of the precipitant used for preparing the transition metal-containing compound include one or more compounds selected from the group consisting of lithium hydroxide (LiOH), sodium hydroxide (NaOH), potassium hydroxide (KOH), lithium carbonate ($Li_2CO_3$), sodium carbonate ($Na_2CO_3$), potassium carbonate ($K_2CO_3$), ammonium carbonate (($NH_4)_2CO_3$), and urea (($NH_2)_2CO$). Hydrates of these compounds may be used as the precipitant, or the compound and the hydrate may be used in combination.

In addition, it is preferable that these precipitants is used as an aqueous solution by being dissolved in water (hereinafter, referred to as an "aqueous solution of the precipitant"). The concentration of the precipitant in the aqueous solution of the precipitant is approximately greater than or equal to 0.5 mol/liter and less than or equal to 10 mol/liter, and is preferably greater than or equal to 1 mol/liter and less than or equal to 8 mol/liter. It is preferable that the precipitant be KOH or NaOH, and it is preferable that the aqueous solution of the precipitant be an aqueous solution of KOH or an aqueous solution of NaOH. In addition, examples of the aqueous solution of the precipitant include ammonia water. The ammonia water and the aqueous solution of the precipitant may be used in combination.

Examples of a method of bringing the mixed aqueous solution into contact with the precipitant include (1) a method in which any one or both of the precipitant and the aqueous solution of the precipitant are added to the mixed aqueous solution, (2) a method in which the mixed aqueous solution is added to the aqueous solution of the precipitant, or (3) a method in which the mixed aqueous solution and any one or both of the precipitant and the aqueous solution of the precipitant are added to water.

It is preferable that the methods of (1) to (3) be performed with stirring. The stirring is performed by suitably using a stirring device such as a shaker or a mixer (for example, a mixing device described below), and in this embodiment, for example, a stirring blade connected to a motor may be used. In the methods described above, (2) the method in which the mixed aqueous solution is added to the aqueous solution of the precipitant is preferable. According to this method, the pH of the aqueous solution of the precipitant is easily maintained during the operation, and the particle diameter of the precipitate to be obtained is easily controlled. In the method of (2), the pH tends to be decreased as adding the mixed aqueous solution to the aqueous solution of the precipitant proceeds. Therefore, it is preferable that the mixed aqueous solution be added while adjusting the pH such that the pH is greater than or equal to 9, and is preferably greater than or equal to 10. The pH can be adjusted by adding the aqueous solution of the precipitant.

Furthermore, the value of the pH described above is a value measured at 25° C. A pH out of the range set herein is included in the range of the present invention insofar as the pH is in the range set herein at the time of being corrected to the pH at 25° C. The pH can be measured by suitably using test paper, a test solution, or an electrical pH measurement device (a pH meter or the like) or other measurement means.

In the coprecipitation method according to the methods of (1) to (3), it is preferable that the atmosphere at the time of the operation be a nitrogen atmosphere or an argon atmosphere in order to suppress the generation of the impurities.

According to the methods of (1) to (3) described above, it is possible to adjust the precipitate containing the transition metal-containing compound.

When the mixed aqueous solution and the precipitant are mixed, slurry containing the precipitate is obtained. The slurry to be obtained is subjected to solid-liquid separation, and the precipitate is collected. Therefore, the precipitate containing the transition metal-containing compound is obtained. The solid-liquid separation may be performed by any method. Examples of a method of the solid-liquid separation include centrifugal separation, drying of a liquid component, filtering, or a combination thereof. Among them, the method of solid-liquid separation such as filtering is preferably used from a viewpoint of an easy operation. In addition, a method of evaporating the liquid component from the slurry, such as heating drying, blowing drying, vacuum drying, or spraying drying may be used.

The collected precipitate may be dried after being washed with a washing liquid. An excessive amount of precipitant is attached to the precipitate obtained after the solid-liquid separation, but it is possible to reduce the attached precipitant by the washing. The washing liquid used in the washing is preferably water, and a water-soluble organic solvent such as alcohol or acetone, and is more preferably water.

Examples of a method of drying the precipitate include heating drying, blowing drying, vacuum drying, or the like. It is preferable that the heating drying be performed under conditions of higher than or equal to 50° C. and lower than or equal to 300° C., and it is more preferable that the heating drying be performed under conditions of higher than or equal to 100° C. and lower than or equal to 200° C.

When washing and drying are set as one washing and drying operation in which the washing by the washing liquid and the drying of the precipitate are combined, this washing and drying operation may be repeatedly performed two or more times.

In the mixing of the sodium compound, the manganese compound, the iron compound, the nickel compound, and the titanium compound, or the mixing of the sodium compound and the transition metal-containing compound, examples of a mixing method include dry mixing or wet mixing. Among them, the dry mixing is preferable from a viewpoint of an easy operation. In this embodiment, specifically, an operation is performed in which the mixture is sealed in a sealed container along with chromium steel or zirconia balls, mechanical stirring is performed, and then the chromium steel or zirconia balls are removed. In the mixing operation, shaking, mechanical stirring, and the like can be suitably used, and in this embodiment, mechanical stirring is performed by the mixing device. Examples of the mixing device used in the mixing include a stir mixing device, a V type mixer, a W type mixer, a ribbon mixer, a drum mixer, or a ball mill.

The mixture obtained by the method described above is calcined, and thus it is possible to obtain the positive electrode-active material for a sodium secondary cell containing a compound metal oxide. The calcination temperature of the mixture can be suitably set depending on the type of the sodium compound to be used.

The calcination temperature is preferably higher than or equal to 400° C. and lower than or equal to 1200° C., and is more preferably higher than or equal to 500° C. and lower than or equal to 1000° C.

In addition, a time for maintaining the calcination temperature is preferably greater than or equal to 0.1 hours and less than or equal to 20 hours, and is more preferably greater than or equal to 0.5 hours and less than or equal to 10 hours.

It is preferable that a temperature rising rate to the calcination temperature be greater than or equal to 50° C./hour and less than or equal to 400° C./hour, and a temperature dropping rate from the calcination temperature to room temperature be greater than or equal to 10° C./hour and less than or equal to 400° C./hour.

Examples of the atmosphere at the time of the calcination include air, oxygen, nitrogen, argon, or mixed gas thereof. The air is preferable from a viewpoint of the ease of controlling the atmosphere, and the oxygen, the nitrogen, the argon, or the mixed gas thereof is preferable from a viewpoint of stability of a sample after the calcination.

Furthermore, a fluoride or a halide such as a chloride is used as the metal-containing compound in a suitable amount, and thus it is possible to control the crystalline properties of the compound metal oxide to be generated and the average particle diameter of the particles configuring the compound metal oxide. The average particle diameter of the particles, for example, is a value which can be measured by using a method such as a dynamic light scattering method, a laser diffraction scattering method, an image imaging method, or a small angle scattering.

In addition, a reaction accelerator (a flux) may be added to the mixture at the time of the calcination in a suitable amount. Examples of the flux include a flux containing NaF, $MnF_3$, $FeF_2$, $NiF_2$, $CoF_2$, NaCl, $MnCl_2$, $FeCl_2$, $FeCl_3$, $NiCl_2$, $CoCl_2$, $Na_2CO_3$, $NaHCO_3$, $NH_4Cl$, $NH_4I$, $B_2O_3$, or $H_3BO_3$. The halide as the metal-containing compound functions as the reaction accelerator (the flux). In the flux, the hydrate of the compounds described above may be used.

In addition, a product (the composite metal oxide) obtained in the calcination described above may be pulverized by arbitrarily using a device generally used in the industry, such as a ball mill, a jet mill, or a vibration mill, or may be washed or classified. According to such an operation, it is possible to adjust the grain size of the positive electrode-active material for a sodium secondary cell. In addition, the calcination described above may be performed two or more times.

In addition, a particle surface of the obtained positive electrode-active material for a sodium secondary cell may be subjected to a surface treatment in which the surface is covered with an inorganic substance containing Si, Al, Ti, Y, or the like. Further, a heat treatment may be performed after such a surface treatment. The BET specific surface area of a powder after the heat treatment is changed from the BET specific surface area of the compound before the heat treatment depending on the temperature of the heat treatment, and thus it is possible to adjust the BET specific surface area of the positive electrode-active material for a sodium secondary cell.

The positive electrode-active material for a sodium secondary cell as described above can be used in the material included in the positive electrode for a sodium secondary cell (used in the manufacturing method of the positive electrode for a sodium secondary cell or used as the material of the manufacturing method described above). By using the positive electrode-active material for a sodium secondary cell described above in the material of the positive electrode for a sodium secondary cell, a sodium secondary cell having an energy density higher than that of the sodium secondary cell of the related art can be obtained.

<Positive Electrode for Sodium Secondary Cell and Manufacturing Method Thereof>

The positive electrode for a sodium secondary cell of this embodiment contains the positive electrode-active material of this embodiment described above. In this embodiment, the positive electrode for a sodium secondary cell is formed by supporting a positive electrode mixture including the positive electrode-active material, a conductive material, and a binder on a positive electrode collector.

Examples of the conductive material include a carbon material such as natural graphite, artificial graphite, cokes, carbon fiber, or carbon black.

Examples of the binder include a thermoplastic resin. Specifically, examples of the thermoplastic resin include a fluorine resin such as polyvinylidene fluoride (hereinafter, referred to as PVDF), polytetrafluoroethylene (hereinafter, referred to as PTFE), an ethylene tetrafluoride-propylene hexafluoride-vinylidene fluoride-based copolymer, a propylene hexafluoride-vinylidene fluoride-based copolymer, or an ethylene tetrafluoride-perfluorovinyl ether-based copolymer; or a polyolefin resin such as polyethylene or polypropylene. In the thermoplastic resin, two or more of the resins may be used.

Examples of a configuration material used in the positive electrode collector include Al, Ni, stainless steel, or the like. Among them, Al is preferable from a viewpoint of the ease of being processed into a thin film and the lower price. The positive electrode collector, for example, is in the shape of a foil, a flat plate, a mesh, a net, a lath or a punching, or a combined shape thereof (for example, in the shape of a mesh-like flat plate, and the like). On the surface of the positive electrode collector, concavities and convexities may be formed by an etching treatment or emboss processing.

The positive electrode for a sodium secondary cell having a configuration as described above includes the positive electrode-active material for a sodium secondary cell of this embodiment described above, and thus when the positive electrode is used in the sodium secondary cell or the manufacturing method of the sodium secondary cell, it is possible to provide a sodium secondary cell having a higher energy density.

Next, a manufacturing method of the positive electrode for a sodium secondary cell of this embodiment will be described. The positive electrode for a sodium secondary cell can be manufactured by supporting the positive electrode mixture including the positive electrode-active material, the conductive material, and the binder on the positive electrode collector.

Examples of a method of supporting the positive electrode mixture on the positive electrode collector include a method in which the positive electrode mixture is fixed to the positive electrode collector by pressure molding, a method in which the positive electrode mixture is fixed to the positive electrode collector through a fixing agent such as a solvent, or the like.

In addition, a method in which an organic solvent is further added to the positive electrode mixture in order to obtain a positive electrode mixture paste, and the positive electrode mixture paste is applied onto the positive electrode collector and is dried in order to fix the positive electrode mixture to the positive electrode collector, can be adopted as the method in which the positive electrode mixture is fixed to the collector through the fixing agent such as a solvent. In this case, for example, as the amount of the positive electrode mixture paste to be applied onto the positive electrode collector, the amount of the paste having a concentration per unit area of the positive electrode collector described below is 0.5 mg/cm$^2$ to 10 mg/cm$^2$. In this method, a sheet obtained by fixing the positive electrode mixture to the positive electrode collector may be pressed, and thus the positive electrode mixture may be strongly fixed to the positive electrode collector.

Examples of the organic solvent used in the positive electrode mixture paste include an amine-based solvent such as N,N-dimethyl aminopropyl amine and diethylene triamine; an ether-based solvent such as tetrahydrofuran; a ketone-based solvent such as methyl ethyl ketone; an ester-based solvent such as methyl acetate; or an amide-based solvent such as dimethyl acetamide, and N-methyl-2-pyrrolidone (hereinafter, referred to as NMP). In the positive electrode mixture paste, for example, when NMP is used as the organic solvent, the positive electrode mixture and the organic solvent are mixed such that a mass ratio with respect to the total mass of the positive electrode mixture paste is 100 g/L to 1000 g/L.

A kneading method at the time of preparing the positive electrode mixture paste is not particularly limited, and a method of mechanically kneading the paste by using a mixing machine such as mixer is preferable as the kneading method. When this method is used, a mixing machine having a high shear stress is preferable as the mixing machine used in the kneading. Specifically, examples of the mixing machine include a planetary mixer, a kneader, an extrusion type kneader, a thin film rotary type high-speed stirrer, and the like.

In a mixing sequence, the positive electrode-active material, the conductive material, the binder, and the solvent may be collectively mixed, or the binder, the positive electrode-active material, and the conductive material may be sequentially mixed into the solvent. This sequence is not particularly limited, and the mixture of the positive electrode-active material and the conductive material may be gradually added to the solvent. In addition, the solvent and the binder may be mixed in advance, and may be dissolved.

Examples of a method of applying the positive electrode mixture paste onto the positive electrode collector includes a slit die coating method, a screen coating method, a curtain coating method, a knife coating method, a gravure coating method, or an electrostatic spray method.

As described above, the positive electrode of this embodiment can be manufactured.

<Sodium Secondary Cell>

The sodium secondary cell of this embodiment includes the positive electrode of this embodiment described above, a negative electrode, and a nonaqueous electrolyte.

(Negative Electrode)

The negative electrode has a potential lower than that of the positive electrode, and can be doped and dedoped with sodium ions. Examples of the negative electrode include an electrode in which a negative electrode mixture including a negative electrode material is supported on a negative electrode collector, or an electrode independently formed of a negative electrode material. Examples of the negative electrode material include a material which has a potential lower than that of the positive electrode and can be doped and dedoped with the sodium ions such as a carbon material, a chalcogen compound (an oxide, a sulfide, and the like), a nitride, metal or an alloy. These negative electrode materials may be independently used, or two or more types thereof may be mixed.

Further, specific examples of the negative electrode material will be described below. Specifically, examples of the carbon material include a material which has a potential lower than that of the positive electrode and can be doped and dedoped with the sodium ions among graphite such as natural graphite and artificial graphite, cokes, carbon black, pyrolytic carbons or carbon fiber, a high molecular calcined body, and the like. The carbon material, the oxide, the sulfide, or the nitride may be independently used, or two or more thereof may be used in combination, and may be crystalline or amorphous. The carbon material, the oxide, the sulfide, or the nitride is mainly supported on the negative electrode collector, and is used as the negative electrode. Specifically, examples of the metal used in the negative electrode material include sodium metal, silicon metal, or tin metal. Examples of the alloy include a sodium alloy such as Na—Al, Na—Ni, and Na—Si; a silicon alloy such as Si—Zn; a tin alloy such Sn—Mn, Sn—Co, Sn—Ni, Sn—Cu, and Sn—La; or an alloy such as $Cu_2Sb$ and $La_3Ni_2Sn_7$. The metal or the alloy is mainly independently used as an electrode (for example, is used in the shape of a foil). Further, examples of the oxide include an oxide such as $Li_4Ti_5O_{12}$.

The negative electrode mixture may contain a binder as necessary. Various resins may be used as the binder, and in particular, examples of the binder include a thermoplastic resin. Specifically, examples of the thermoplastic resin include PVDF, thermoplastic polyimide, carboxy methyl cellulose, polyethylene, polypropylene, and the like. When the electrolyte solution does not contain ethylene carbonate described below and the negative electrode mixture contains polyethylene carbonate, the cycle characteristics and large current discharge properties of a cell to be obtained are improved.

Examples of the negative electrode collector include Cu, Ni, stainless steel, Al, or the like. Among them, Cu or Al is preferable from a viewpoint of difficulty of forming an alloy with sodium and easiness of processing to the thin film. As with the positive electrode, examples of a method of supporting the negative electrode mixture on the negative electrode collector include a method of pressure molding; and a method in which a negative electrode mixture paste is obtained by using an organic solvent or the like, a sheet is obtained by applying the paste onto the negative electrode collector and by drying the paste, and the obtained sheet is pressed, and thus the negative electrode mixture is fixed to a collector.

(Nonaqueous Electrolyte)

Examples of the nonaqueous electrolyte which can be used in the sodium secondary cell of this embodiment include $NaClO_4$, $NaPF_6$, $NaAsF_6$, $NaSbF_6$, $NaBF_4$, $NaCF_3SO_3$, $NaN(SO_2CF_3)_2$, a lower aliphatic sodium carboxylate, or $NaAlCl_4$. These materials may be independently used, or a mixture of two or more thereof may be used. It is preferable that the electrolyte include at least one fluorine-containing sodium salt selected from the group consisting of $NaPF_6$, $NaAsF_6$, $NaSbF_6$, $NaBF_4$, $NaCF_3SO_3$, and $NaN(SO_2CF_3)_2$.

In addition, the nonaqueous electrolyte described above can be used as the nonaqueous electrolyte solution by being dissolved in the organic solvent. Furthermore, the nonaqueous electrolyte indicates an electrolyte for being dissolved in the nonaqueous electrolyte such as an organic solvent, and solubility with respect to water and moisture content are not particularly limited.

Examples of the organic solvent in the nonaqueous electrolyte solution include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-one, or 1,2-di(methoxy carbonyl oxy) ethane;

ethers such as 1,2-dimethoxy ethane, 1,3-dimethoxy propane, pentafluoropropyl methyl ether, 2,2,3,3-tetrafluoropropyl difluoromethyl ether, tetrahydrofuran, or 2-methyl tetrahydrofuran;

esters such as methyl formate, methyl acetate, or γ-butyrolactone;

nitriles such as acetonitrile or butyronitrile; amides such as N,N-dimethyl formamide or N,N-dimethyl acetamide;

carbamates such as 3-methyl-2-oxazolidone;

a sulfur-containing compound such as sulfolane, dimethyl sulfoxide, or 1,3-propane sultone; or an organic solvent having a fluorine substituent group in which a fluorine substituent group is further introduced to the organic solvent described above.

It is preferable that a part of the organic solvent in the nonaqueous electrolyte solution include an organic solvent having a fluorine substituent group.

Examples of the organic solvent having a fluorine substituent group include 4-fluoro-1,3-dioxolan-2-one (hereinafter, referred to as FEC or fluoroethylene carbonate), trans or cis-4,5-difluoro-1,3-dioxolan-2-one (hereinafter, referred to as DFEC or difluoroethylene carbonate), and the like.

Preferable is 4-fluoro-1,3-dioxolan-2-one as the organic solvent having a fluorine substituent group.

One type of the organic solvent having a fluorine substituent group may be used, and it is preferable that the organic solvent be used as a mixed solvent combined with an organic solvent not having a fluorine substituent group. When the organic solvent having a fluorine substituent group is included in a part of the organic solvent of the nonaqueous electrolyte solution, a ratio of the organic solvent having a fluorine substituent group with respect to the total nonaqueous electrolyte solution is in a range of greater than or equal to 0.01 volume % and less than or equal to 10.0 volume %, is preferably in a range of greater than or equal to 0.1 volume % and less than or equal to 8.0 volume %, and is more preferably in a range of greater than or equal to 0.5 volume % and less than or equal to 5.0 volume %.

The nonaqueous electrolyte described above can be used as an electrolyte in a shape where the nonaqueous electrolyte solution described above is maintained in a high molecular compound, that is, a gel-like electrolyte.

In addition, a solid electrolyte can also be used as the nonaqueous electrolyte which can be used in the sodium secondary cell of this embodiment.

A high molecular electrolyte such as a polyethylene oxide-based high molecular compound and a high molecular compound having at least one or more of a polyorganosiloxane chain and a polyoxy alkylene chain can be used as the solid electrolyte. In addition, when a sulfide electrolyte such as $Na_2S$—$SiS_2$, $Na_2S$—$GeS_2$, $Na_2S$—$P_2S_5$, or $Na_2S$—$B_2S_3$, an inorganic compound electrolyte including a sulfide such as $Na_2S$—$SiS_2$—$Na_3PO_4$ or $Na_2S$—$SiS_2$—$Na_2SO_4$, or a NASICON type electrolyte such as $NaZr_2(PO_4)_3$ is used as the solid electrolyte, and it is possible to further increase safety.

In addition, in the sodium secondary cell of this embodiment, when the solid electrolyte is used, the solid electrolyte may function as a separator described below. In this case, a separator may not be necessary.

(Separator)

The sodium secondary cell of this embodiment may include a separator arranged between the positive electrode and the negative electrode. The separator, for example, is in the shape of a porous film, a non-woven fabric, a woven fabric, or the like.

Examples of a forming material of the separator include materials such as a polyolefin resin such as polyethylene or polypropylene, a fluorine resin, or a nitrogen-containing aromatic polymer. In addition, the separator may be a single layer or a laminated separator in which two or more types of the materials are used.

Examples of the separator include separators disclosed in Japanese Unexamined Patent Application, Publication No. 2000-30686 or Japanese Unexamined Patent Application, Publication No. 10-324758.

It is preferable as the thickness of the separator becomes thinner insofar as mechanical strength is maintained from a viewpoint of increasing the volume energy density of the cell and of decreasing inner resistance. In general, the thickness of the separator is preferably greater than or equal to 5 μm and less than or equal to 200 μm, and is more preferably greater than or equal to 5 μm and less than or equal to 40 μm.

The separator preferably includes a porous film containing a thermoplastic resin. In the sodium secondary cell, when an abnormal current flows through the cell due to a short circuit between the positive electrode and the negative electrode, it is preferable that a flow of an excessive current be prevented (shut down) by blocking the current.

When the separator includes the porous film containing a thermoplastic resin, the shut down occurs because a fine hole is blocked due to softening or melting of the porous film of the separator when the separator in a short-circuit portion is overheated due to the short circuit and the temperature exceeds a (general) usage temperature set in advance. Then, after being shut down, it is preferable that the separator not be broken due to the temperature even when the temperature in the cell increases to a certain degree of high temperature, and heat resistance is high to the extent of maintaining the shut down state.

A separator formed of a laminated porous film in which a heat-resistant porous layer containing a heat-resistant resin and a porous film containing a thermoplastic resin are laminated is used as the separator, and thus it is possible to further prevent thermal film breakage. Here, the heat-resistant porous layer may be laminated on both surfaces of the porous film.

(Configuration of Sodium Secondary Cell)

Figure 1B:
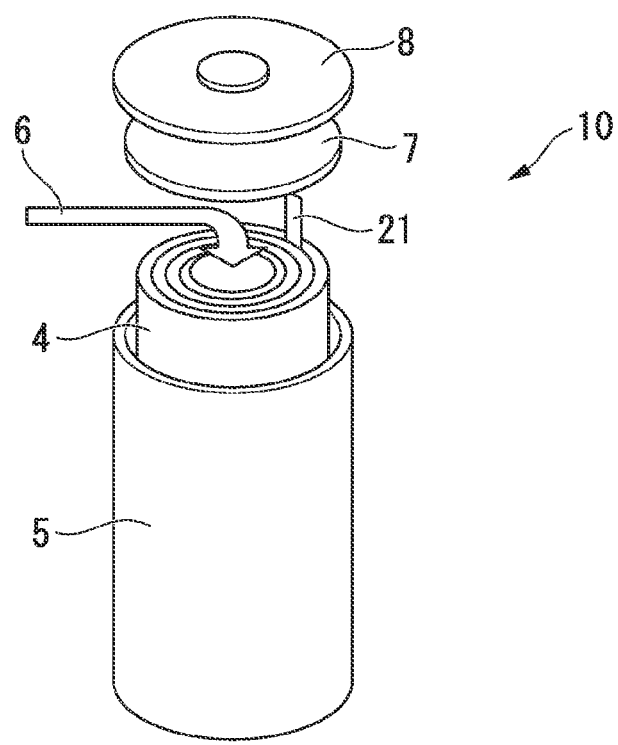
FIG. 1B is a schematic view illustrating an example of the sodium secondary cell of the liquid of this embodiment.

FIG. 1A and FIG. 1B are schematic views illustrating an example of the configuration of the sodium secondary cell of this embodiment.

As illustrated in FIG. 1A, a sodium secondary cell 10 of this embodiment is provided with an electrode group 4 including a pair of strip-like separators 1, a strip-like positive electrode 2 having a lead 21 on one end, and a strip-like negative electrode 3 having a lead 31 on one end. In the illustrated example, the electrode group 4 is formed by sequentially laminating the separator 1, the positive electrode 2, the separator 1, and the negative electrode 3, and by winding them.

As illustrated in FIG. 1B, the sodium secondary cell 10 of this embodiment contains the electrode group 4 and an insulator (not illustrated) in a battery can 5. The battery can 4 contains an electrolyte solution 6, and the electrode group 4 is dipped in the electrolyte solution 6. Accordingly, the electrolyte is arranged between the positive electrode 2 and the negative electrode 3. Further, an upper portion of the battery can 5 is sealed with a top insulator 7 and a sealing body 8.

The electrode group 4, for example, is in the shape of a column such that the sectional surface at the time of cutting the electrode group 4 in a direction perpendicular to a winding axis is in the shape of a circle, an ellipse, a rectangle, or a rounded rectangle. In this embodiment, the electrode group 4 is in the shape of a cylinder (the sectional surface is approximately in the shape of a circle).

In addition, the sodium secondary cell having such an electrode group 4 can be in a shape defined in IEC60086 or MS C 8500 (standards for a cell set by International Electrotechnical Commission (IEC)). For example, the sodium secondary cell can be in the shape of a cylinder, a rectangle, or the like.

(Manufacturing Method of Sodium Secondary Cell)

The cylindrical sodium secondary cell 10 of this embodiment is manufactured as follows. The separator 1, the positive electrode 2, the separator 1, and the negative electrode 3 are sequentially laminated and are wound, and thus the electrode group 4 is formed. Subsequently, the electrode group 4 and the insulator are contained in the battery can 4. Subsequently, the electrolyte solution 6 is impregnated in the electrode group 4, and the electrolyte is arranged between the positive electrode 2 and the negative electrode 3. Further, the upper portion of the battery can 5 is sealed with the top insulator 7 and the sealing body 8, and thus the sodium secondary cell 10 can be manufactured.

As a modification aspect of this embodiment, the sodium secondary cell is not limited to the sodium secondary cell having a winding type configuration described above, and may be a sodium secondary cell having a laminated configuration in which a laminated structure of the positive electrode, the separator, the negative electrode, and the separator is repeatedly superimposed. A so-called coin type cell, a button type cell, or a paper type (or a sheet type) cell can be exemplified as the laminated sodium secondary cell.

The sodium secondary cell having the configuration as described above includes the positive electrode for a sodium secondary cell of this embodiment described above, and thus an energy density is higher.

<Usage of Sodium Secondary Cell>

The sodium secondary cell of this embodiment has a higher energy density, and thus can be suitably used as a small cell power source for a small device such as a mobile phone, a portable audio, or a laptop computer, and a medium or large cell for movement such as a power source for a transporting device such as an automobile, a motorcycle, an electric chair, a forklift, a train, an airplane, a ship, a spacecraft, or a submarine; a power source for a machine such as a cultivator; an outdoor power source for camping; or an outdoor/indoor power source for a vending machine.

In addition, an abundant raw material that can be obtained at lower cost can be used in the sodium secondary cell of this embodiment, and thus can be suitably used for a medium or a large cell which is a stationary cell such as an outdoor/indoor installed power source for a manufacturing plant, a house, or the like; a load leveling power source for various power generation such as a charging device for a solar cell or a charging device for a wind power generation; an installed power source for a device that operates in a lower temperature environment such as inside of a freezing and refrigerating warehouse or in an extremely cold region; an installed power source for a device that operates in a high temperature environment such as the desert; or an installed power source for a device that operates in an extraterrestrial environment such as an installed power source for a space station.

As described above, a preferred modification example according to one embodiment of the present invention is described with reference to the drawings, and the present invention is not limited thereto. Various shapes or combinations of the constituting members in the example described above are examples, and various changes based on design requirements or the like can be used within a range not deviating from the gist of the present invention.

EXAMPLES

Hereinafter, one embodiment of the present invention will be more specifically described with reference to examples, but the present invention is not limited to the following examples unless the scope is changed.

<Evaluation Method>

In this example, the manufactured positive electrode-active material was measured by using the following method, and a sodium secondary cell using the positive electrode-active material was prepared and evaluated.

(1) Powder X-Ray Diffraction Measurement

The crystal structure of the positive electrode-active material was measured by using a powder X-ray diffraction measurement device RINT2500TTR manufactured by Rigaku Corporation in the following conditions unless particularly designated.

X-ray: CuKα
Voltage-Current: 40 kV-140 mA
Measurement Angle Range: 2θ=10° to 90°
Step: 0.02°
Scanning Speed: 4°/minute (2) Preparation of Positive Electrode Acetylene black (manufactured by Denki Kagaku Kogyo Kabushiki Kaisha) as the positive electrode-active material manufactured by a method described below and the conductive material and PVDF (manufactured by Kureha Corporation) as the binder were weighed to have a composition of positive electrode-active material:conductive material:binder=80:10:10 (a mass ratio).

After that, first, the positive electrode-active material and the acetylene black were sufficiently mixed with an agate mortar, N-methyl-2-pyrrolidone (NMP: manufactured by Tokyo Chemical Industry Co., Ltd.) was added to this mixture, PVDF was added thereto and was continuously mixed with the agate mortar to be homogeneous. Therefore, a positive electrode mixture paste was obtained.

The obtained positive electrode mixture paste was applied onto an aluminum foil which was a collector and had a thickness of 40 μm to have a thickness of 100 μm by using an applicator. The collector coated with the positive electrode mixture paste was put into a drier, and was dried while removing the NMP. Therefore, an electrode sheet was obtained. This electrode sheet was punched to have a diameter of 1.5 cm by using an electrode punching machine, and then was pressed by hand pressing. Therefore, a positive electrode including the positive electrode-active material was obtained.

(3) Preparation of Cell

The positive electrode described above was disposed in an indentation of lower parts of a coin cell (manufactured by Hohsen Corporation) by setting the aluminum foil to be downward, and thus 1 M of $NaPF_6$/propylene carbonate as the electrolyte solution, a polypropylene porous film (a thickness of 20 μm) as the separator, and metal sodium (manufactured by Sigma-Aldrich Corporation) as the negative electrode were combined. Therefore, a cell was prepared. Furthermore, the cell was assembled in a glove box containing an argon atmosphere.

(4) Evaluation of Sodium Secondary Cell

The prepared cell was subjected to a charging and discharging test in the following conditions. In a cycle test, when charging and discharging were repeatedly performed, charging and discharging in the following conditions were repeated.

Conditions at Charging: Constant current (CC) charging was performed at 0.2 C rate (a velocity of performing full charging for 5 hours) from a rest potential to 3.8 V.

Conditions at Discharging: Constant current (CC) discharging was performed at 0.2 C rate (a velocity of performing full discharging for 5 hours), and thus cutoff was performed at a voltage of 2.0 V.

<Example 1> Na:Fe:Ni:Mn:Ti=1:0.4:0.3:0.2:0.1

Sodium carbonate ($Na_2CO_3$: manufactured by Wako Pure Chemical Industries, Ltd.: purity of 99.8%), iron oxide (II,III) ($Fe_3O_4$: manufactured by Kojundo Chemical Lab. Co., Ltd.: purity of 99%), nickel oxide (II) (NiO: manufactured by Kojundo Chemical Lab. Co., Ltd.: purity of 99%), manganese oxide (IV) ($MnO_2$: manufactured by Kojundo Chemical Lab. Co., Ltd.: purity of 99.9%), and titanium oxide ($TiO_2$: manufactured by Kojundo Chemical Lab. Co., Ltd.: purity of 99.9%) were weighed as the metal-containing compound such that a molar ratio of Na:Fe:Ni:Mn:Ti was 1.00:0.40:0.30:0.20:0.10, and were mixed for 4 hours by using a dry ball mill. Therefore, a mixture of a metal-containing compound was obtained.

The obtained mixture of the metal-containing compound was put into an alumina calcined container and was maintained at 800° C. for 6 hours in an air atmosphere by using an electric furnace, the mixture described above was calcined, and then was cooled to room temperature. Therefore, a positive electrode-active material 1 which was a composite metal oxide was obtained.

Figure 2:
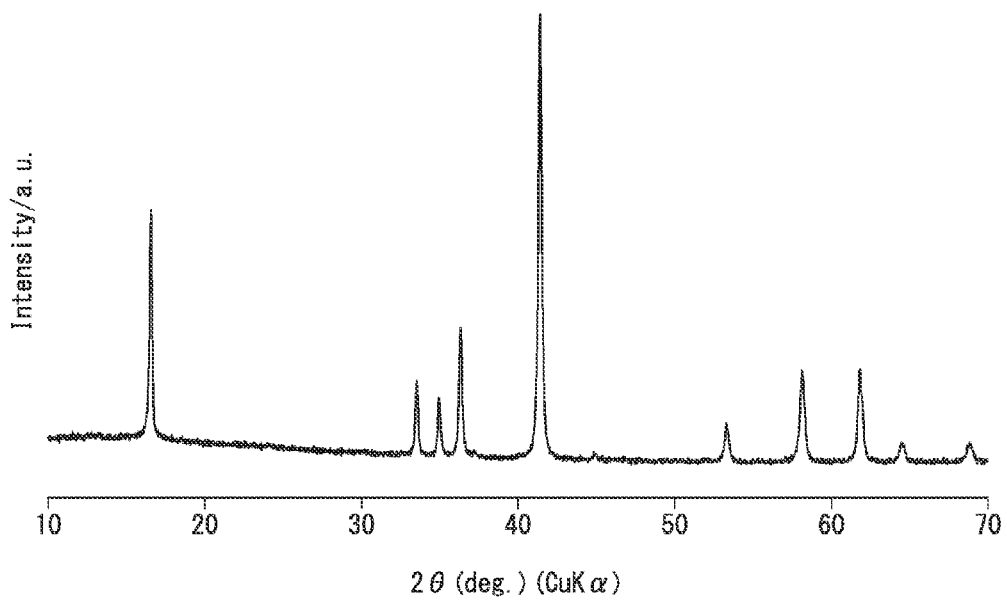
FIG. 2 is a graph of an XRD chart illustrating a result of an example.

FIG. 2 is an XRD chart illustrating results of the powder X-ray diffraction measurement of the positive electrode-active material 1. In the drawing, an XRD chart of a range of 10° to 70° among the measurement results in the measurement angle range described above is illustrated.

From the results of the measurement, it was found that the crystal structure of the positive electrode-active material 1 belonged to an α-$NaFeO_2$ type crystal structure which was one layer, and was a single phase without an impurity phase being observed.

<Example 2> Na:Fe:Ni:Mn:Ti=1:0.4:0.3:0.1:0.2

A positive electrode-active material 2 which was a compound metal oxide was obtained by using the same method as that in Example 1 except that the metal-containing compound was used such that a molar ratio of Na:Fe:Ni:Mn:Ti was 1.0:0.40:0.30:0.10:0.20.

Figure 3:
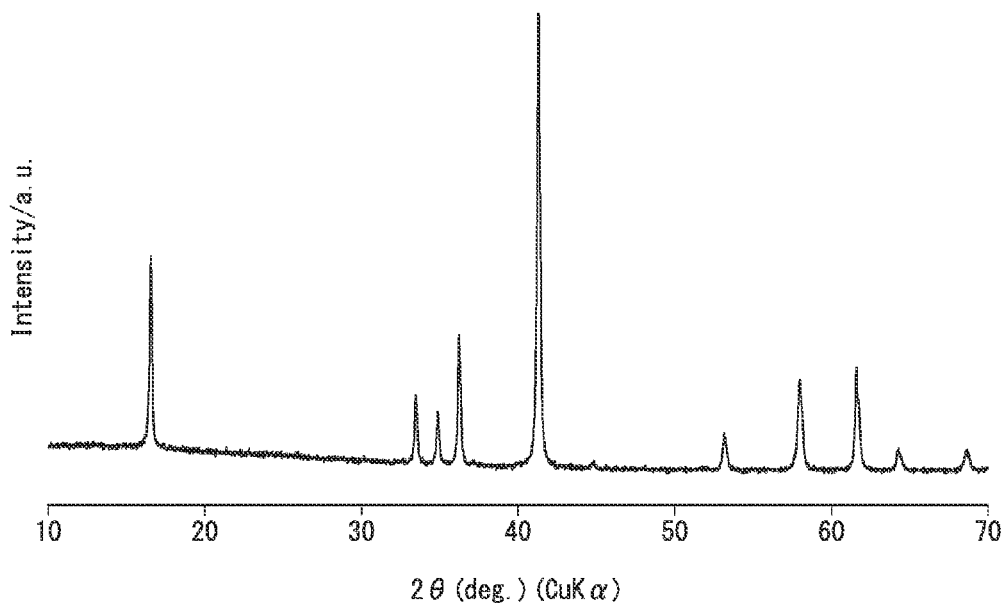
FIG. 3 is a graph of the XRD chart illustrating the result of the example.

FIG. 3 is an XRD chart illustrating the results of the powder X-ray diffraction measurement of the positive electrode-active material 2, and corresponds to FIG. 2. From the results of the measurement, it was found that the crystal structure of the positive electrode-active material 2 belonged to an α-$NaFeO_2$ type crystal structure which was one layer, and was a single phase without an impurity phase being observed.

Comparative Example 1

Na:Fe:Ni:Mn=1:0.4:0.3:0.3

A positive electrode-active material 3 which was a composite metal oxide was obtained by using the same method as that in Example 1 except that the metal-containing compound was used such that a molar ratio of Na:Fe:Ni:Mn was 1.00:0.40:0.30:0.30 without using $TiO_2$ which was a Ti source.

Figure 4:
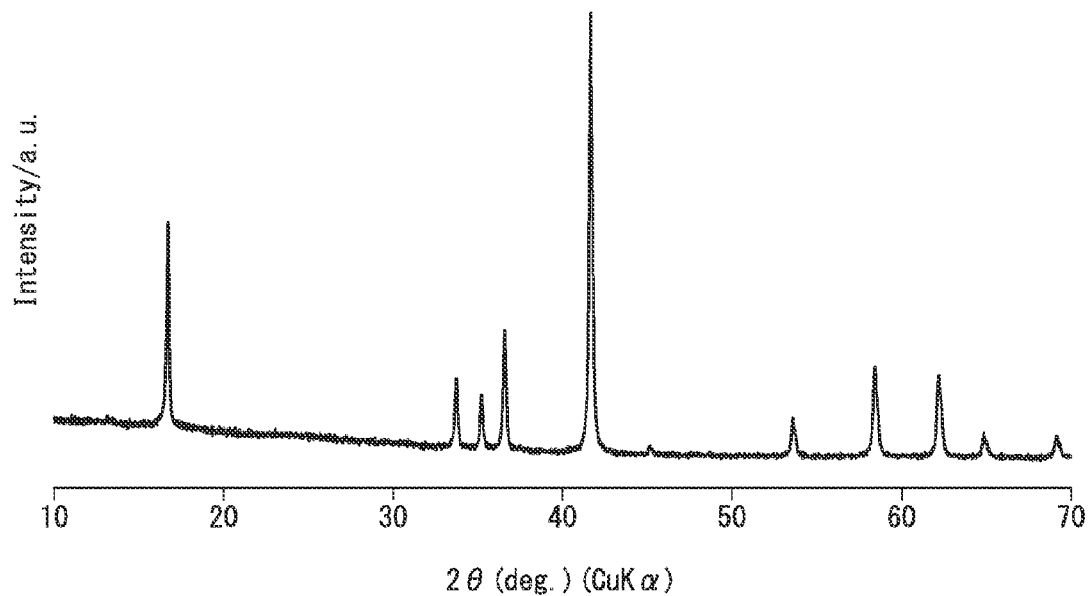
FIG. 4 is a graph of an XRD chart illustrating a result of a comparative example.

FIG. 4 is an XRD chart illustrating the results of the powder X-ray diffraction measurement of the positive electrode-active material 3, and corresponds to FIG. 2. From the results of the measurement, it was found that the crystal structure of the positive electrode-active material 3 belonged to an α-NaFeO$_2$ type crystal structure which was one layer, and was a single phase without an impurity phase being observed.

<Evaluation of Sodium Secondary Cell>

(1) Energy Density

A positive electrode was prepared by using the positive electrode-active material 1, and a sodium secondary cell 1 was prepared by using the method described above.

In the charging and discharging conditions described above, the charging and discharging performance of the sodium secondary cell 1 was evaluated, and as a result thereof, the charging and discharging could be performed. The energy density of the active material calculated from a product of discharge capacitance (mAh/g) of the active material obtained from a discharge capacitance value of the first cycle of the sodium secondary cell 1 and a discharge voltage (V) was 413.2 mWh/g.

As with the positive electrode-active material 1, sodium secondary cells were prepared by using the positive electrode-active materials 2 and 3, and the charging and discharging performance was evaluated.

As a result of the evaluation, in the sodium secondary cell 2 using the positive electrode-active material 2, an energy density per an active material weight was 419.6 mWh/g.

In addition, in the sodium secondary cell 3 using the positive electrode-active material 3, an energy density per an active material weight was 410.3 mWh/g.

As a result of the evaluation, it was found that the energy density of the sodium secondary cell of Examples 1 and 2 was higher than that of the sodium secondary cell of Comparative Example 1, and when the positive electrode-active material for a sodium secondary cell of this embodiment was used, a sodium secondary cell having a high energy density was obtained.

(2) Operating Potential

Figure 5:
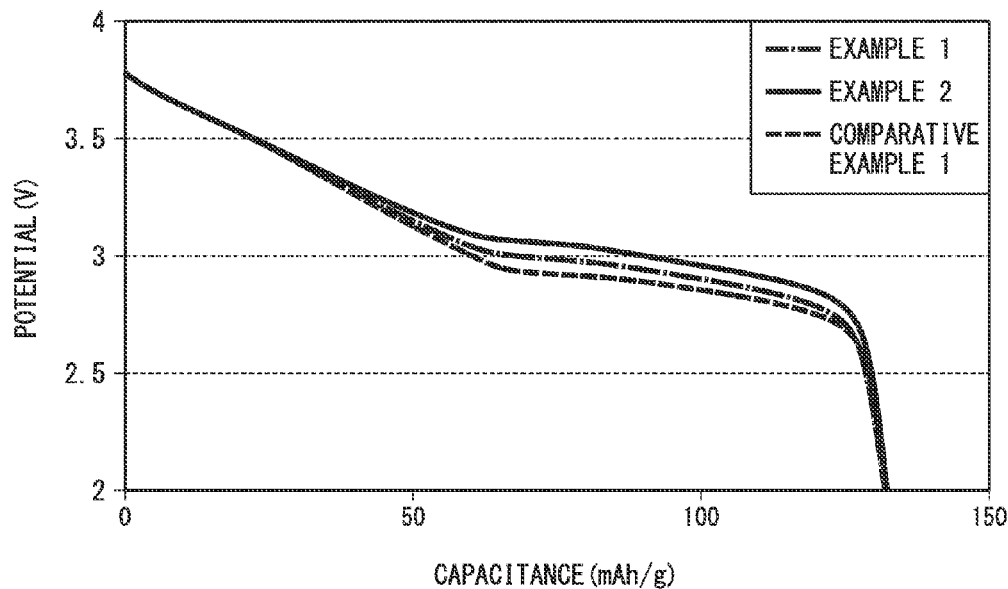
FIG. 5 is a graph illustrating the result of the example.

FIG. 5 is a graph illustrating a discharge curve at the time of performing initial discharge of the sodium secondary cells 1 to 3. In the graph of FIG. 5, a horizontal axis indicates capacitance (unit: mAh/g) and a vertical axis indicates a voltage (unit: V).

As illustrated, the voltage of a flat portion of the sodium secondary cells 1 and 2 using the positive electrode-active materials 1 and 2 of Examples 1 and 2 was improved compared to the sodium secondary cell 3 using the positive electrode-active material 3 of Comparative Example 1 in which the crystal structure included an α-NaFeO$_2$ type crystal structure but did not contain Ti. For this reason, it was found that the sodium secondary cell using the positive electrode-active material of this embodiment could improve operating potential.

(3) Cycle Characteristics

Figure 6:
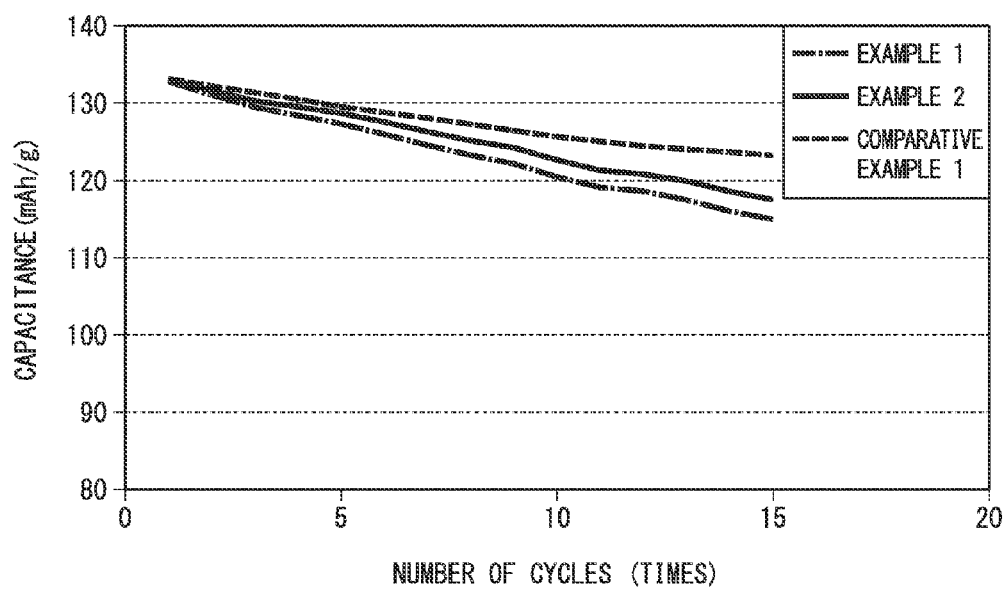
FIG. 6 is a graph illustrating the result of the example.

FIG. 6 is a graph illustrating the results of measurement of the cycle characteristics of the sodium secondary cells 1 to 3. In the graph of FIG. 6, a horizontal axis indicates the number of cycles (unit: times) and a vertical axis indicates capacitance (unit: mAh/g).

As illustrated, the charging and discharging was repeated 15 times, and no remarkable decrease in the capacitance of the sodium secondary cells 1 and 2 of Examples 1 and 2 was observed.

From the results, the usefulness of this embodiment was confirmed.

INDUSTRIAL APPLICABILITY

According to the present invention, it is possible to provide a positive electrode-active material for a sodium secondary cell which can be used in a sodium secondary cell having a high energy density, a positive electrode for a sodium secondary cell, and a sodium secondary cell.

REFERENCE SIGNS LIST

1: SEPARATOR
2: POSITIVE ELECTRODE
3: NEGATIVE ELECTRODE
4: ELECTRODE GROUP
5: BATTERY CAN
6: ELECTROLYTE SOLUTION
7: TOP INSULATOR
8: SEALING BODY
10: SODIUM SECONDARY CELL
21,31: LEAD

The invention claimed is:

1. A positive electrode-active material for a sodium secondary cell including a composite metal oxide which has an α-NaFeO$_2$ type crystal structure and is represented by Formula (1) described below, $$Na_a(Fe_wNi_xMn_{y-z}Ti_z)O_2 \tag{1}$$

wherein a is greater than or equal to 0.6 and less than or equal to 1.0, w is greater than 0 and less than 0.5, x is greater than 0 and less than 0.5, y is greater than 0.03 and less than or equal to 0.5, z is greater than or equal to 0.03 and less than 0.5, w+x+y=1.0, and y>z.

2. The positive electrode-active material for a sodium secondary cell according to claim 1, wherein z is less than or equal to 0.3.

3. The positive electrode-active material for a sodium secondary cell according to claim 1, wherein y is greater than or equal to 0.2.

4. The positive electrode-active material for a sodium secondary cell according to claim 1, wherein w is greater than or equal to 0.15 and less than or equal to 0.45.

5. The positive electrode-active material for a sodium secondary cell according to claim 1, wherein a, w, x, and y satisfy the relationship of a+3w+2x+4y=4.

6. A positive electrode for a sodium secondary cell which contains the positive electrode-active material for a sodium secondary cell according to claim 1.

7. A sodium secondary cell, comprising:
a positive electrode;
a negative electrode; and
a nonaqueous electrolyte,
wherein the positive electrode is the positive electrode for a sodium secondary cell according to claim 6.

8. The sodium secondary cell according to claim 7, further comprising:
a nonaqueous electrolyte solution in which the nonaqueous electrolyte is dissolved in an organic solvent,
wherein the organic solvent includes an organic solvent having a fluorine substituent group.

9. The sodium secondary cell according to claim 8, wherein the organic solvent having the fluorine substituent group is 4-fluoro-1,3-dioxolan-2-one.

10. The sodium secondary cell according to claim 7 further comprising:
a separator arranged between the positive electrode and the negative electrode.

11. The sodium secondary cell according to claim 10, wherein the separator includes a laminated porous film in which a heat-resistant porous layer containing a heat-resistant resin and a porous film containing a thermoplastic resin are laminated.

* * * * *